Figure 1:
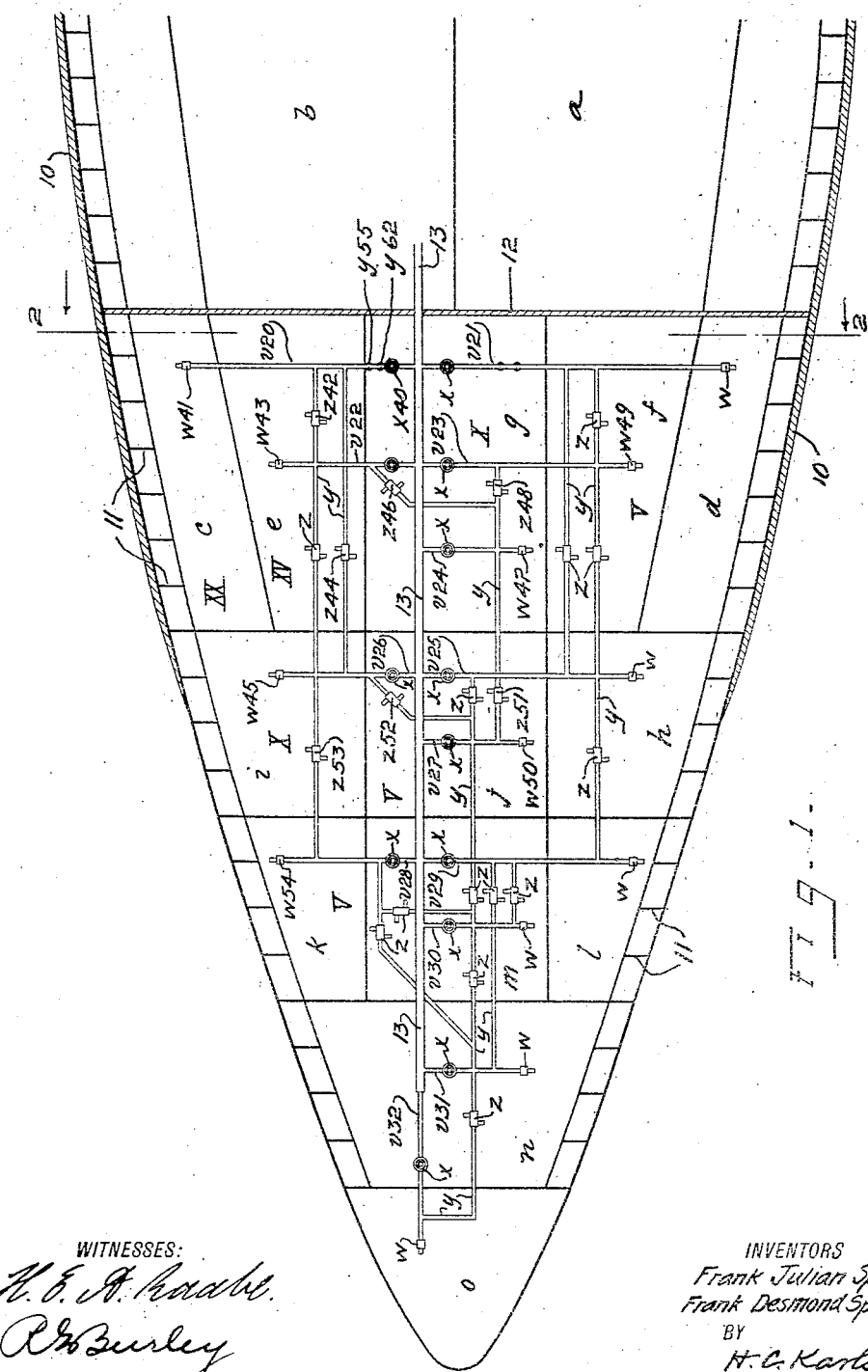

F. J. & F. D. SPRAGUE.
METHOD AND MEANS FOR AUTOMATICALLY APPLYING DIFFERENTIAL AIR PRESSURE TO COMPARTMENTS OF SHIPS.
APPLICATION FILED MAR. 15, 1912.

1,113,257.

Patented Oct. 13, 1914.
4 SHEETS—SHEET 1.

WITNESSES:

INVENTORS
Frank Julian Sprague
Frank Desmond Sprague
BY
H. C. Karlson
ATTORNEY

F. J. & F. D. SPRAGUE.
METHOD AND MEANS FOR AUTOMATICALLY APPLYING DIFFERENTIAL AIR PRESSURE TO COMPARTMENTS OF SHIPS.
APPLICATION FILED MAR. 15, 1912.

1,113,257.

Patented Oct. 13, 1914.
4 SHEETS—SHEET 3.

WITNESSES:

INVENTORS
Frank Julian Sprague
Frank Desmond Sprague
BY
H. C. Karlson
ATTORNEY

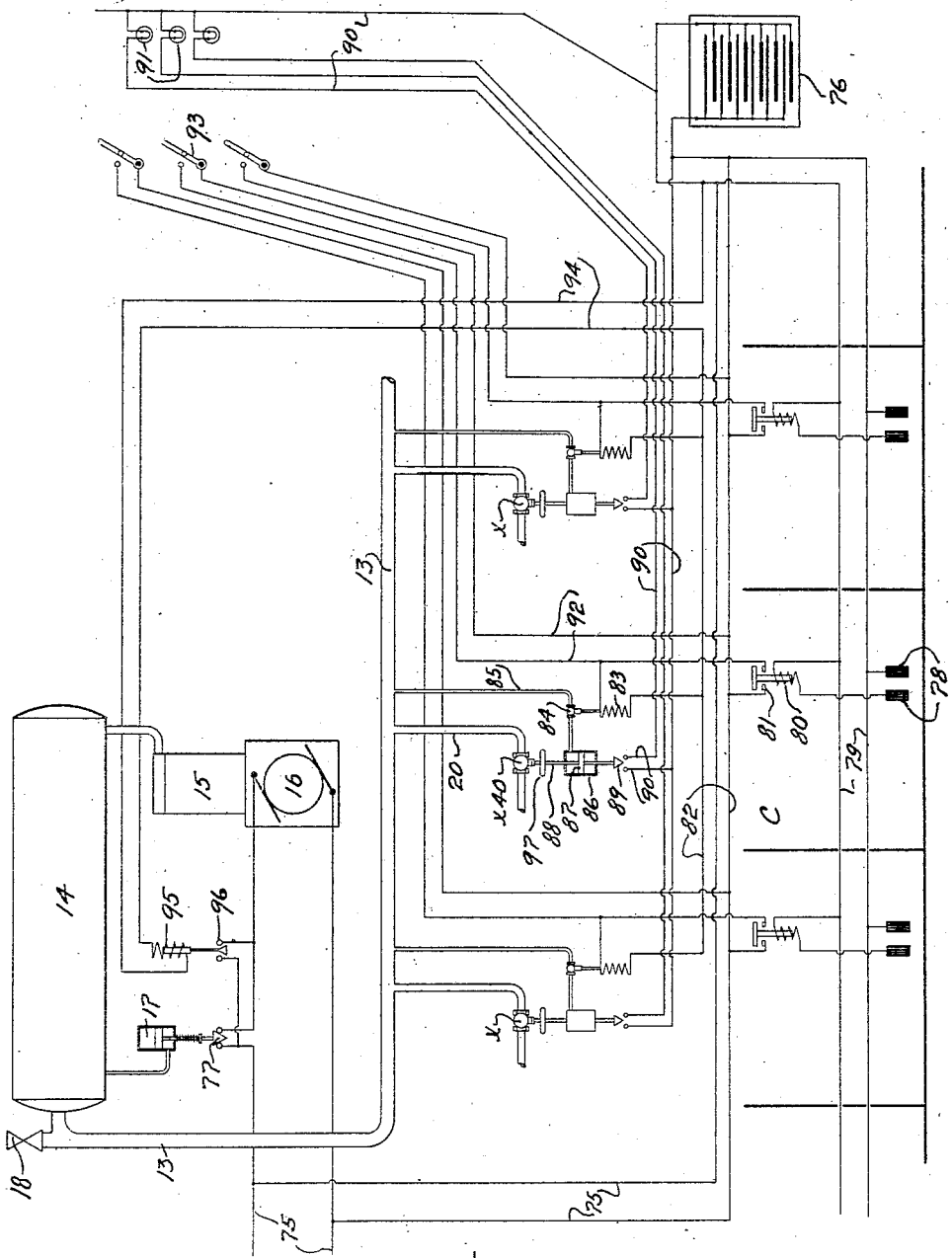

UNITED STATES PATENT OFFICE.

FRANK JULIAN SPRAGUE AND FRANK DESMOND SPRAGUE, OF NEW YORK, N. Y.

METHOD AND MEANS FOR AUTOMATICALLY APPLYING DIFFERENTIAL AIR-PRESSURE TO COMPARTMENTS OF SHIPS.

1,113,257. Specification of Letters Patent. Patented Oct. 13, 1914.

Application filed March 15, 1912. Serial No. 683,967.

*To all whom it may concern:*

Be it known that we, FRANK JULIAN SPRAGUE and FRANK DESMOND SPRAGUE, citizens of the United States, and residents of the borough of Manhattan, in the city and county of New York and State of New York, have invented certain new and useful Improvements in the Method and Means for Automatically Applying Differential Air-Pressure to Compartments of Ships, of which the following is a specification.

This invention relates to a system utilizing air under pressure for saving a vessel from further disablement or sinking after suffering an injury to one of its compartments whether by grounding, collision, gunfire or torpedo attack.

As a measure of safety, the hulls of battle ships and other vessels are of cellular construction, being divided into a large number of water tight compartments by the various decks of the ship and longitudinal and transverse water tight bulkheads interposed between the same. These compartments are connected by means of water tight doors which are closed in time of action or upon suffering an injury, making each compartment an air tight individual cell. The bulkheads vary greatly in stiffness and their ability to stand pressure. At certain given intervals the ship may be divided transversely by main transverse bulkheads of exceedingly stiff and reinforced construction. Such bulkheads may be located fore and aft of the engine and boiler rooms, and are fully capable of withstanding any pressure that can be brought to bear on them. The remaining, and in fact the large majority of the bulkheads, however, are not of this construction, and these, as also the decks would be in danger of buckling or blowing out on the application of excessive hydrostatic or air pressure on one side alone. It follows that if a compartment is damaged so that it becomes filled with water, even though it be sealed off from the other compartments, the vessel may not be saved, because the bulkheads may collapse under the hydrostatic pressure. Or if compressed air were forced into the affected compartment or compartments so as to expel the water, the air pressure being as great as the hydrostatic pressure, might have the same effect.

To this end, the invention comprises an automatic differential air system connecting adjacent compartments of a ship. The system may be so arranged that, whenever a considerable or dangerous hydrostatic or air pressure is produced in any compartment, its bulkhead and decks are sustained against buckling by the automatic introduction into the adjacent compartments of air pressure lower than this excessive pressure but sufficiently high for the purpose, other air pressures, correspondingly or suitably stepped down being automatically introduced into the compartments next removed, if necessary, and so on, always automatically, until the pressures in the compartments last supplied exceed atmospheric pressure by no more than a safe margin.

More especially the invention comprises a system whereby compressed air may be supplied, either automatically or otherwise, to any injured compartment or compartments, under such pressure as to expel the water therefrom, air under automatically differentiated or stepped down pressure being automatically supplied to adjacent compartments, and in the same manner still further stepped down to more remote compartments, according to the degree of pressure in the original or injured compartment or compartments.

The system preferably comprises oppositely acting differential or reducing valves between the adjacent compartments, so that a predetermined excess of air pressure in any one will cause the air to find entrance under reduced pressure into the adjacent compartments.

In its preferred embodiment, the invention comprises a system of serially and reciprocally interconnected air lines having main or cut-off valves for admitting compressed air to any one or more of the compartments and automatic relief valves between the different compartments adjusted to graduate the flow of air in any direction so as to protect the vertical and horizontal partitions from being strained beyond endurance.

A further object is to provide for automatic as well as for remote control of the cut-off valves in conjunction with independent manual control thereof.

A still further object is to provide for storage and automatic replenishing of the air for the differential supply line in combination with dual systems of energy for controlling the same.

One of the more specific features of the invention is a simple, efficient double acting differential valve, controlling the flow of air therethrough.

Another feature is the provision of the terminals of the compressed air lines in the different compartments with automatic check nozzles which permit egress of air but not ingress of water, air or foreign matter into said air lines.

Systems for supplying compressed air to submerged portions of ships, damaged by grounding or collision, gun or torpedo attack, heretofore attempted have depended upon manual control for graduating the pressures according to the strength of the bulkheads and decks dividing the compartments. By possible incapacitating of this control at the crucial moment, during battle or accident, the entire system would be rendered inoperative. Also due to confusion or excitement, an excessive air pressure may be imposed upon the partitions of the injured or any of the other compartments to an extent that would endanger the whole structure the same as the influx of water at the corresponding pressure would be liable to do.

The present invention is designed to supply the maximum amount of compressed air as rapidly as possible without injury to the divisional bulkheads and decks. The air pressures in a damaged compartment and those adjacent thereto, as well as the compartments farther away therefrom are graduated automatically by means of differential valves having predetermined adjustment according to the resisting power of the bulkheads and decks. These differential valves are interposed in a system of pipes serially and reciprocally interconnecting all the compartments of the ship located either at or below the water line, in such a manner that no matter what compartment or supply of air therefor is incapacitated, the adjacent compartments with their air pressures will prevent the total disablement of the ship. The air through this differential system can be applied automatically by the rising of the water within a damaged compartment or from a remote part of the ship or by direct manual operation, either of these controls being independent of each other.

Figure 2:
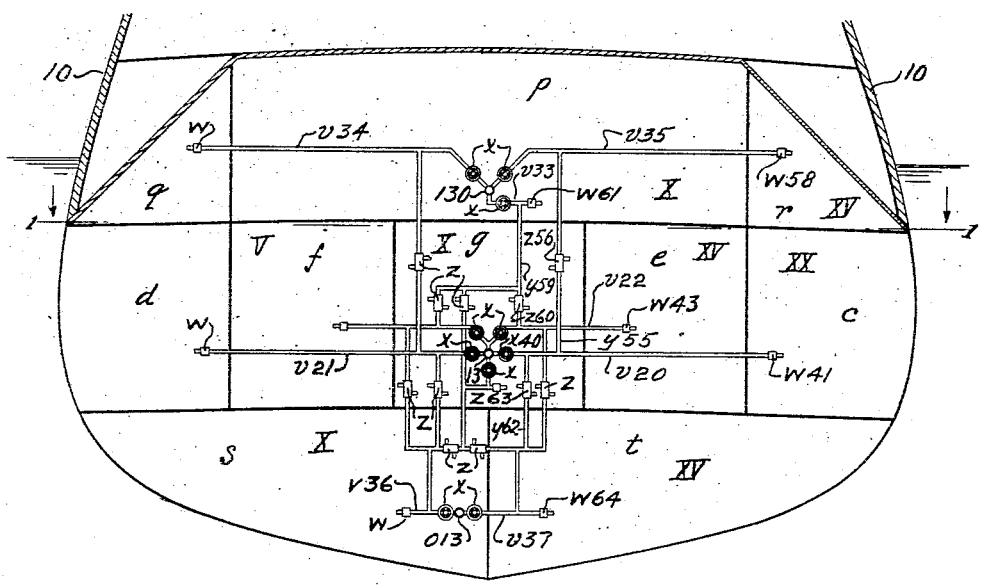

In the drawings hereto annexed Figure 1 is a sectional plan view on the line 1—1 of Fig. 2, showing diagrammatically the differential air system applied to the after-lower platform deck of a modern battle ship. Fig. 2 is a cross section on the line 2—2 of Fig. 1 looking aft in the direction of the arrows, showing diagrammatically the connection between the vertical and horizontal air lines.

Figure 3:
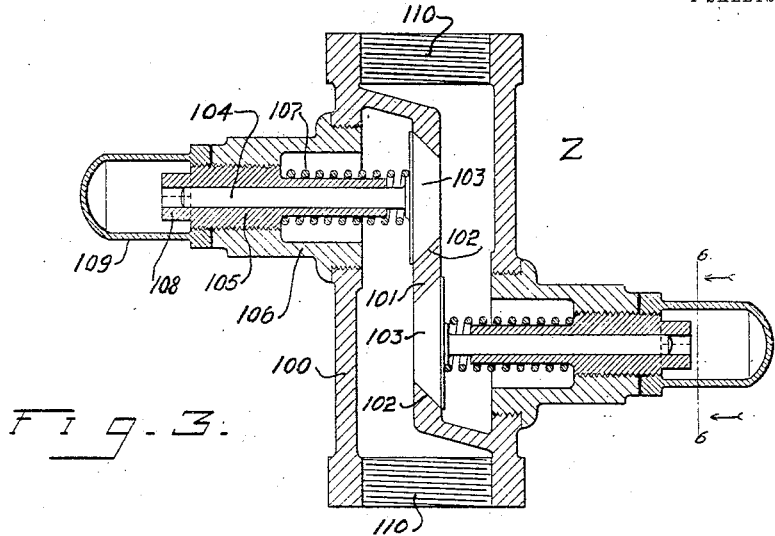
Figures 4, 5, 6:
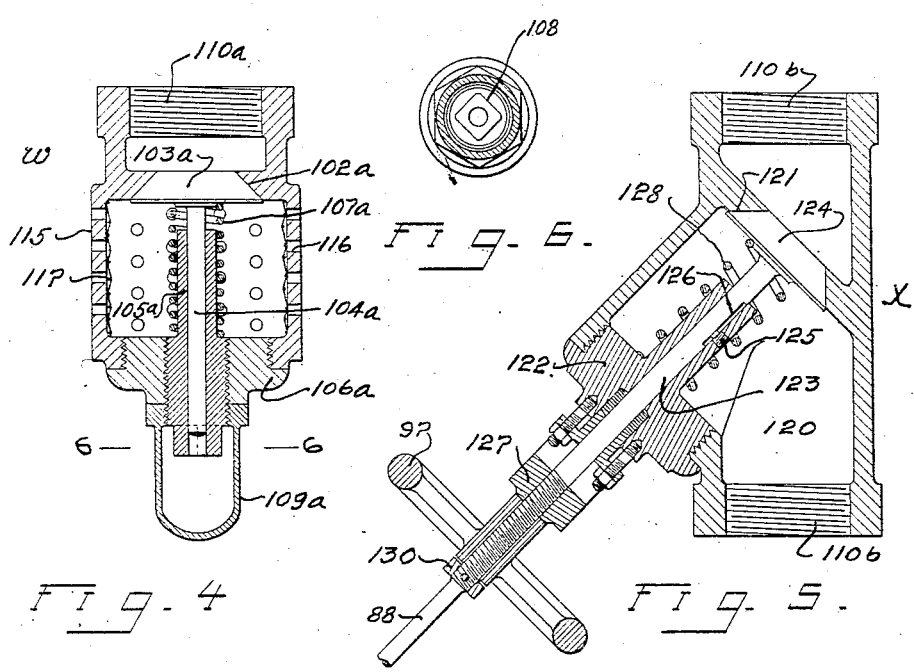

Fig. 3 is an enlarged sectional detail view of one form of the differential valves interposed in the air lines. Fig. 4 is an enlarged sectional detail view of one form of check nozzles for terminating each air line. Fig. 5 is an enlarged sectional detail view of one form of the cut-off valves controlling each branch air-line. Fig. 6 is a section on the line 6—6 of Figs. 3 and 4 in the direction of the arrows, and Fig. 7 is a diagrammatic view of the automatic as well as the remote electrical control of the air lines, showing the air storage and replenishing apparatus in conjunction with duplicate electrical energy systems.

For purposes of illustration the accompanying drawings represent a battle ship, of which 10 is the side armor, 11 the frames of the hull and 12 the armored, reinforced bulkhead dividing the engine and boiler rooms from the rear portion of the ship.

The system as diagrammatically illustrated in its preferred embodiment and the preferred construction of certain of its parts will now be briefly described. It will be understood, however, that this description is not to be taken in a limiting sense, and that numerous other embodiments and forms of construction are possible.

Fig. 1 represents a portion of the platform deck, the compartments represented are lettered $a, b, c, d, e, f, g, h, i, j, k, l, m, n$ and $o$ respectively, compartments $a$ and $b$ are protected by the stout bulkhead 12. Fig. 2 represents three decks, showing compartments $d, f, g, e$ and $c$ of the platform deck, $p, q$ and $r$ of the deck above, and $s$ and $t$ of the deck below. Each deck may have a main air line running longitudinally thereof. Such a main air line is indicated at 13 for the platform deck, another at 130 for the deck above, and another at 013 for the deck below. The main air line or lines are connected with any suitable source or reservoir of compressed air, as a pump 15 driven by an electric motor 16 and compressing air into a reservoir or tank 14, from which the main line or lines extend (Fig. 7). Obviously there may be more than one source or reservoir of compressed air. Branch lines $v^{20}$, $v^{21}$ &c. lead from the main air line or lines and open into the several compartments by terminals $w$. Each branch is preferably opened and closed by a main or cut-off valve $x$, so that air may be admitted in the first instance to any one or more of the compartments. The several branch lines are cross-connected both horizontally and vertically by connecting lines $y$ having oppositely acting differential or relief valves $z$ therein. These cross-lines $y$ connect the branch lines in advance or beyond their valves $x$, that is, between these valves and the terminals $w$. The several differential valves $z$ are initially set to open at pressures previously determined upon in accordance with the strength of bulkheads and decks and other conditions. For better understanding, $v^{20}$ is the branch line for compartment $c$, $v^{21}$ for compartment $d$, $v^{22}$ for compartment $e$, $v^{23}$ for compartment $f$, $v^{24}$ for compartment $g$, $v^{25}$ for compartment $h$, $v^{26}$ for compartment $i$, $v^{27}$ for compartment $j$, $v^{28}$ for compartment $k$, $v^{29}$ for compartment $l$, $v^{30}$ for compartment $m$, $v^{31}$ for compartment $n$, $v^{32}$ for compartment $o$, $v^{33}$ for compartment $p$, $v^{34}$ for compartment $q$, $v^{35}$ for compartment $r$, $v^{36}$ for compartment $s$, and $v^{37}$ for compartment $t$.

The system can best be comprehended by considering the operation thereof with reference to any one of the compartments. Suppose compartment $c$ to become damaged and it required, say, 20 lbs. air pressure to keep the inrushing water out. First cut-off valve $x^{40}$ pertaining to this compartment would be opened, either automatically by the water, by remote electrical control or manually, as will be more particularly described hereinafter. Air would then flow through branch line $v^{20}$ and issue through terminal nozzle $w^{41}$ into compartment $c$. The differential valve $z^{42}$, set, say for a differentiation of 5 lbs., would permit the air to enter branch line $v^{22}$ and thence issue through nozzle $w^{43}$ into compartment $e$, at 15 lbs. pressure. The air would also open differential valve $z^{44}$, which may be set for a differential of 10 lbs. by virtue of the fact that the bulkheads between compartments $c$ and $i$ and $e$ and $i$ could withstand a wider range of differentiation; and the air would issue through nozzle $w^{45}$, into said compartment $i$, at 10 lbs. pressure. The differential valve $z^{46}$, set at a differential of 5 lbs. would permit the air to issue also through nozzle $w^{47}$ into compartment $g$ at 10 lbs. pressure. The differential valve $z^{48}$, also would permit air to issue through nozzle $w^{49}$ into compartment $f$ at 5 lbs. pressure, which the bulkhead between compartments $f$ and $d$ is supposedly strong enough to withstand. The compartment $j$ would be supplied through nozzle $w^{50}$ with air graduated to 5 lbs. pressure stepped down through either of the differential valves $z^{51}$ or $z^{52}$. The pressure of air prevailing in branch line $v^{29}$ seeks its way out through differential $z^{53}$ and issues through $w^{54}$, into compartment $k$, stepped down to a pressure of 5 lbs. per square inch. It will be understood that the foregoing figures are purely illustrative. The terminal pressure is reached when the stepped down air supply is unable to overcome the force of the springs in the final valves $z$ in the several series. The differentiation of pressure may vary by any amounts. In the same manner the operation of the system with reference to any compartment as initially supplied or high pressure compartment may be traced. In any case the relative positions of the cut-off and differential relief valves is such, that opening of any cut-off valve admits air directly to the corresponding compartment and permits it to flow along various paths, horizontally and vertically, including series of the relief valves, which allow the air to enter successively to adjacent and more remote compartments as the pressures rise. The arrangement is preferably such, that the air is compelled to open only one differential relief valve between any two adjacent compartments.

It is understood that air lines can be placed in armored galleries, as conventional for piping on board war vessels, without interfering with the relative disposition of the connections.

In the vertical section (Fig. 2), the compartments $c$, $e$, $g$ and $f$ and $d$ correspond to those shown in plan Fig. 1, the air in passing line $v^{20}$ out through nozzle $w^{41}$ also enters the riser line $y^{55}$, passing through differential valve $z^{56}$ where it is stepped down to 15 lbs. pressure and following air line $v^{35}$, where it issues through nozzle $w^{58}$ into compartment $r$. As before stated the air was delivered through line $v^{22}$ and nozzle $w^{43}$ at 15 lbs. pressure. It passes from said line through riser $y^{59}$, and differential valve $z^{60}$, issuing through nozzle $w^{61}$, into compartment $p$ at 10 lbs. pressure. From the line $v^{20}$ it passes through drop line $y^{62}$, being stepped down through differential valve $z^{63}$, and issuing through nozzle $w^{64}$ into compartment $t$ at 15 lbs. pressure. The differentiation of pressures between compartments $t$ and $s$ as well as through other horizontally adjacent compartments is taken care of by the horizontal air lines which are obviously duplicated for each deck level in conformity with the specific arrangement of the compartments. The same applies to the vertical risers and drop lines throughout the structure of the ship.

In Fig. 7 the main air line 13 is shown connected up with a tank 14 which is charged by an air compressor 15 that is driven by an electric motor 16 which is on the ship's lighting circuit 75. Said motor 16 can also get its power from a storage battery 76, that is also floating on the lighting circuit. When the pressure falls in the tank 14 a pressure operated switch 77, actuated by the spring opposed pneumatic cylinder and piston device 17 connected up with said tank will start the motor going, and when the desired pressure has been reached the piston will break the circuit and stop the motor. Accidental overcharging of the tank 14 is prevented by opening of the relief valve 18. Automatic means are provided for opening the main cut-off valves $x$ in branch lines $v$, which means comprise a pair of electrodes 78 in each compartment, which when the water rises therein closes one of the branches of a relay circuit 79, fed from either the storage battery 76 or lighting circuit 75. Said circuit when closed energizes a primary sensitive solenoid 80 which closes a contact switch 81, that in its turn throws the current on the corresponding branch of a parallel circuit 82, energizing a secondary powerful solenoid 83. The latter actuates a pilot valve 84, which is in a sub-branch air line 85, connected up with the main air line 13. Air is then admitted to a pneumatic cylinder 86 open to the atmosphere at one end and having a piston 87 attached to the projecting valve spindle 88 of the cut-off valve $x$. The air pressure on said piston 87 will open the valve $x$ whereby the air is thrown into the damaged compartment. The end of the spindle 88 is provided with a contact switch 89 which closes the corresponding branch of a signal circuit 90, that is also fed by the battery or from the ship's lighting circuit. Lamps 91 or other signal devices are interposed in the branches of the circuit 90, to indicate the position of the cut-off valve. The solenoids 83 are also included in branches 92 of the circuit 82. The terminals of these branches are connected up with hand operated knife switches 93. Such switches may be disposed in any desirable portion of the ship, as at the navigating bridge, conning tower or engine room. Thus, the cut off valves $x$ may be opened from a distant point to admit air to any one or more of the compartments. In whatever manner the valves may be operated the signals 91 indicate whether they have opened and which compartments are affected. Whenever current is on the circuit 82, as the result, either of the closing of one of the switches 93 or the connecting of the electrodes 78 by salt water, it flows by conductors 94, included in that circuit, through a solenoid 95, which closes a switch 96, to start the motor 16. In this way the air compressor is automatically started upon opening of any one or more of the valves $x$. The dual controls, as 17—77 and 95—96 insure starting of the motor 16 even if one of them were out of order. The valves $x$ are adapted to be opened manually by hand wheels 97 independently of automatic or remote control.

Fig. 3 illustrates the preferred form of differential valve $z$, the same comprising a body or casing 100 divided centrally by a partition 101, provided with oppositely disposed seats 102 coacting with oppositely acting valves 103 of puppet or mushroom type. Each valve has a stem 104 slidable in a guide 105, said guide being adjustable in a bonnet 106 received in the casing 100. A spring 107 between the guide and the valve holds the latter to the seat 102. The tension of the spring is varied by adjusting the guide 105, which is provided with a squared shank 108 for applying a wrench. A cap 109 engages the said guide 105 to lock the latter and make a tight joint with the bonnet 106. Sockets 110 are threaded to receive the cross air line pipes $y$. While the two oppositely acting valves of each pair are preferably located in one air line, this is not essential, furthermore, a single valve may be made to play the part of two.

Fig. 4 illustrates one of the check nozzles $w$, for terminating the branch lines $v$ in the several compartments. It comprises a body or casing 115, having perforations 116, for escape of air, and a metallic gauze-mantle 117 to prevent solid matter from entering the casing to effect a proper seating of valve $103^a$ on seat $102^a$. Said valve has a stem $104^a$ slidable in a guide $105^a$, which is adjustable in a bonnet $106^a$. The valve is seated by a spring $107^a$. There is also a cap $109^a$. These elements are shown similar to those of the differential valve $z$. The spring $107^a$ is adjusted so that the air pressure of a pound or a fraction thereof will overcome its force. $110^a$ is a socket for the pipe $v$.

The main cut-off or controlling valve $x$ shown in Fig. 5, comprises a body 120 having a seat 121. A bonnet 122 fastened to the said body 120 slidably receives stem 123 of a valve 124 which coöperates with the seat 121. The stem 123 is prevented from rotating by a pilot screw 125 engaging a groove 126 in said stem. The latter is slidable in a yoke 127 which is secured to the bonnet 122. A spring 128 keeps the valve closed. The hereinbefore mentioned handwheel 97 is in threaded engagement with the valve stem 123. Exerting thrust against the yoke 127, it pulls the valve 124 away from the seat 121, when rotated. A collar 130 pinned to the stem 123 prevents the handwheel 97 from unscrewing when turned in the opposite direction. The extension 88 of the valve stem 123 is connected up with the piston 87 of the air cylinder 86, as hereinbefore mentioned.

It is obvious that provisions would be made to automatically seal or check ventilation conduits or other independent supply of air to the compartments, to prevent water or compressed air from backing out through such pipes.

Having described our invention what we desire to secure by Letters Patent and claim is:

1. The combination with the fluid tight compartments of a vessel, of means for supplying compressed air to the several compartments, and reversibly operative means capable of effecting automatic differentiation of the air pressures therein in accordance with their respective distances from an injured compartment.

2. The combination with the fluid tight compartments of a vessel, of a source or reservoir of air under pressure, and means for admitting air therefrom into the compartments under pressures graduated serially with respect to the pressures in any one or more of them, said means being capable of automatically reversing the flow of air from one compartment to another.

3. The combination with the fluid tight compartments of a vessel, of a source or reservoir of air under pressure, and means controlled by predetermined pressures in any one or more of the compartments for causing the admission or air under predetermined differentiated pressures reciprocally into and from adjacent compartments.

4. The combination with the fluid tight compartments of a vessel, of a source or reservoir of compressed air, and means for admitting air therefrom to any one of the compartments when injured to expel the water, and at the same time automatically admitting the air under differentiated pressures serially into adjacent compartments more or less remote according as the initial pressures increase.

5. The combination with the fluid tight compartments of a vessel, of means for producing air pressures in the compartments, and relief valves capable of differentiating the pressures in opposite directions between said compartments.

6. The combination with the fluid tight compartments of a vessel, of a source or reservoir of compressed air, air lines opening into the several compartments, and differential relief valves operating to graduate the flow of air in one direction or the other between adjacent compartments.

7. The combination with the fluid tight compartments of a vessel, of a source or reservoir of compressed air, interconnected air lines delivering into the several compartments, and automatic relief valves acting oppositely to differentiate the flow of air in one direction or the other through the connections of said air lines.

8. The combination with the fluid tight compartments of a vessel, of a source or reservoir of compressed air, interconnected air lines delivering into the several compartments, relief valves in the connections thereof capable of differentiating the pressures in reverse directions, and check valves in the delivery portions of said connections.

9. The combination with the fluid tight compartments of a vessel, of a source or reservoir of compressed air, air lines connected therewith delivering into the several compartments, relief valves capable of acting in opposite directions in said air lines, and screened outlets at the terminals of the several lines.

10. The combination with the fluid tight compartments of a vessel, of a source or reservoir of compressed air, air lines opening into the several compartments, cut-off valves for said air lines, and oppositely acting relief valves operating automatically to differentiate the pressures between the compartments in all directions.

11. The combination with the fluid tight compartments of a vessel, of an air-pump, an air tank connected therewith, a main line leading from said tank, branch lines opening into the several compartments, cut-off valves for the several branches, and relief valves capable of graduating the air pressures in variable amounts between the compartments in opposite directions.

12. The combination with the fluid tight compartments of a vessel, of means for producing air pressures in the several compartments, and relief devices capable of differentiating the pressures, between the compartments in reverse directions, each of said devices comprising a casing and two valves therein responsive to pressures from either side.

13. The combination with the fluid tight compartments of a vessel, of a source or reservoir of compressed air, and a system of interconnected air lines communicating with the several compartments, said air lines including relief valves constructed and arranged to graduate the flow of air between the compartments oppositely in predetermined proportions.

14. The combination with the fluid tight compartments of a vessel, of a source or reservoir of compressed air, conduits connected therewith and opening into the several compartments, valves for opening and closing said conduits to admit air to the corresponding compartments, and air lines connecting said conduits beyond their said valves, said air lines containing relief valves operating to differentiate the pressure either way from one compartment to another.

15. The combination with the fluid tight compartments of a vessel, of a source or reservoir of compressed air, means for automatically admitting air therefrom to any compartment, and automatic means for conveying predeterminedly differentiated air pressures into adjacent and more remote compartments serially and reciprocally.

16. The combination with the fluid tight compartments of a vessel, of a source or reservoir of compressed air, air lines serially and reciprocally connecting the several compartments, cut-off valves therefor, relief valves capable of differentiating the pressure of air flowing through said lines in either direction, and means controlled by water in any of the compartments for causing the opening of the cut-off valve thereof.

17. The combination with the fluid tight compartments of a vessel, of a source or reservoir of compressed air, air lines opening into the several compartments, means for differentiating the air pressures through said lines serially and reciprocally, cut-off valves therefor, and automatic means for opening said cut-off valves.

18. The combination with the fluid tight compartments of a vessel, of a source or reservoir of compressed air, air lines communicating with the several compartments, valves for admitting the air into the several compartments, electric circuits controlled by water in the several compartments, relays in said circuits, other circuits controlled by said relays, and devices in the last named circuits for operating said valves.

19. The combination with the fluid tight compartments of a vessel, of a source or reservoir of compressed air, air lines communicating with the several compartments, valves for admitting the air into the several compartments, electric circuits controlled by water in the several compartments, relays in said circuits, other circuits controlled by said relays, pneumatic devices for operating said valves, other valves for admitting air to said pneumatic devices, and devices in the said other circuit for operating the last mentioned valves.

20. The combination with the fluid tight compartments of a vessel, of a source or reservoir of compressed air, air lines communicating with the several compartments, valves for admitting the air into the several compartments, means including electric circuits and devices for automatic and distant control of said valves, and independent normal means for operating the valves.

21. The combination with the fluid tight compartments of a vessel, of a source or reservoir of compressed air, valves for admitting air to the several compartments, signals at a distant point, and electric connections whereby said signals are operated by said valves.

22. The combination with the fluid tight compartments of a vessel, of a source or reservoir of compressed air, valves for admitting the air to the several compartments, signals at a distant point indicating the several compartments, electric circuits controlled by water in the several compartments, connections whereby said circuits cause the opening of said valves, and other connections whereby said signals are also operated.

23. The combination with the fluid tight compartments of a vessel, of a source or reservoir of compressed air, air lines communicating with the several compartments and valves for admitting the air thereto, an air compressor, a motor for driving the same, and means actuated by the opening of any of said valves for starting said motor.

24. The combination with the fluid tight compartments of a vessel, of a source or reservoir of compressed air, air lines communicating with the several compartments and valves for admitting the air thereto, an air compressor, a motor for driving the same, means actuated by a fall in pressure in the system for starting said motor, and means for starting said motor upon operation of said valves to admit air to any one or more of the compartments.

25. The combination with the fluid tight compartments of a vessel, of means for producing air pressures in the compartments, and means for automatically differentiating said air pressures in a predetermined ratio with respect to the strength of any one or more of the compartments and to the direction of application of the pressures.

26. The combination with the fluid tight compartments of a vessel, of a source or reservoir of compressed air, air lines serially and reciprocally connecting the several compartments, cut-off valves therefor, relief valves operating to differentiate the air pressure in opposite directions, and electric means controlled by water in any of the compartments for causing the opening of the cut-off valve thereof.

27. The combination with the fluid tight compartments of a vessel, of means for producing air pressures therein, air conduits serially and reciprocally interconnecting the several compartments, and automatic relief valves in said conduits operating to differentiate the air flowing into said compartments, said valves being capable of adjustment to graduate the air in variable amounts in reverse directions.

28. The combination with the fluid tight compartments of a vessel, of means for producing air pressures in the several compartments, and relief valve devices between said compartments capable of automatically differentiating the pressures in reverse directions, each of said devices comprising a casing having openings for inlet and outlet, a partition in the casing dividing the interior thereof between said openings, said partition having valve seats therein, and oppositely acting puppet valves coöperating with said seats.

29. The combination with the fluid tight compartments of a vessel, of a source or reservoir of compressed air, and a system of interconnected air lines communicating with the several compartments, the system including means for admitting air to any one or more of the compartments, and means for automatically introducing stepped down air pressure successively either way through the same lines into adjacent and more remote compartments.

30. The combination with the fluid tight compartments of a vessel, of a source or reservoir of compressed air, a system of serially and reciprocally interconnected air lines having outlets into the several compartments, relief valves capable of differentiating the air pressure in opposite directions, and main cut-off valves, there being a main valve so positioned that the opening thereof admits air directly into its compartment and also along various paths including series of said relief valves to the outlets into adjacent and more remote compartments.

31. The combination with the fluid tight compartments of a vessel, of a source or reservoir of compressed air, air lines communicating with the several compartments, valves for admitting the air into the several compartments, pneumatic devices for operating said valves, pilot valves for admitting air to said pneumatic devices, circuits including means for operating said pilot valves and switches controlling said circuits.

32. The combination with the fluid tight compartments of a vessel, of a source or reservoir of compressed air, air lines communicating with the several compartments, valves for admitting the air into the several compartments, pneumatic devices for operating said valves including pistons connected with the stems thereof, and operating hand-wheels having engagement with said valve stems and movable therewith under the action of said pistons.

33. The combination with the fluid tight compartments of a vessel, of a source or reservoir of compressed air, valves for admitting air to the several compartments, means for automatically opening the valve of any compartment in case of injury to the latter, signals at distant points, and electric connections whereby a corresponding signal is operated upon the opening of any of said valves.

34. The combination with the fluid tight compartments of a vessel, of a source or reservoir of compressed air, air lines connecting with the several compartments and valves for admitting air thereto, an air compressor, a motor for driving the same, and means actuated by a fall of pressure in the system for automatically starting said motor to replenish the air source 35. The combination with the fluid tight compartments of a vessel, of means for producing air pressures therein, air lines between the several compartments, and automatic relief valves in said air-lines, said valves being capable of differentiating the air pressures in reverse directions, whereby the several compartments are serially and reciprocally interconnected with respect to the air pressures.

Signed in the borough of Manhattan in the county of New York and State of New York this 12th day of March A. D. 1912.

FRANK JULIAN SPRAGUE.
FRANK DESMOND SPRAGUE.

Witnesses:
  B. McLaughlan,
  D. M. Mackaye.

---

Copies of this patent may be obtained for five cents each, by addressing the "Commissioner of Patents, Washington, D. C."